US012767412B1

(12) United States Patent
Whitis

(10) Patent No.: US 12,767,412 B1
(45) Date of Patent: Oct. 20, 2026

(54) MULTI-LAYER, MULTI-WIDTH CUSHIONING WRAP WITH INTEGRAL CLOSURE FLAPS

(71) Applicant: Brent Price Whitis 2014 Descendant's Trust, Corsicana, TX (US)

(72) Inventor: Brent Price Whitis, Corsicana, TX (US)

(73) Assignee: Brent Price Whitis 2014 Descendant's Trust, Corsicana, TX (US)

( * ) Notice: Subject to any disclaimer, the term of this patent is extended or adjusted under 35 U.S.C. 154(b) by 0 days.

(21) Appl. No.: 19/289,263

(22) Filed: Aug. 4, 2025

Related U.S. Application Data

(60) Provisional application No. 63/836,491, filed on Jul. 1, 2025.

(51) Int. Cl.

| | |
|---|---|
| ***B65D 81/03*** | (2006.01) |
| ***B32B 3/10*** | (2006.01) |
| ***B32B 3/26*** | (2006.01) |
| ***B32B 3/28*** | (2006.01) |
| ***B32B 37/20*** | (2006.01) |
| ***B32B 38/00*** | (2006.01) |
| ***B32B 38/04*** | (2006.01) |

(52) U.S. Cl.

CPC ................ *B65D 81/03* (2013.01); *B32B 3/10* (2013.01); *B32B 3/266* (2013.01); *B32B 3/28* (2013.01); *B32B 37/20* (2013.01); *B32B 38/0004* (2013.01); *B32B 38/04* (2013.01); *B32B 2038/047* (2013.01); *B32B 2250/44* (2013.01); *B32B 2307/7375* (2023.05); *B32B 2553/026* (2013.01)

(58) Field of Classification Search

CPC .. B32B 3/10; B32B 3/266; B32B 3/28; B32B 37/20; B32B 38/0004; B32B 38/04; B32B 2038/047; B32B 2250/44; B32B 2307/7375; B32B 2553/026; B65D 81/03; B65D 85/67; B65D 85/671; B65D 85/672

USPC ............... 206/521, 523, 389–416; 229/87.02

See application file for complete search history.

(56) References Cited

U.S. PATENT DOCUMENTS 1,470,200 A 10/1923 Snyder
2,553,923 A 5/1951 Lambert
(Continued)

FOREIGN PATENT DOCUMENTS

GB 2311487 A 1/1997
WO 9857854 A1 12/1998

OTHER PUBLICATIONS

International Search Report and Written Opinion issued Mar. 10, 2026 in PCT/US2025/043506, filed Aug. 26, 2025 (12 pages).

*Primary Examiner* — Bryon P Gehman
(74) *Attorney, Agent, or Firm* — NovoTechIP International PLLC

(57) ABSTRACT

A cushioning wrap for wrapping an object and preventing damage to the object includes a plurality of layers of cushioning material. The plurality of layers include at least an inner layer and an outer layer. The inner layer has a first width, and the outer layer has a second width that is greater than the first width. Closure flaps are defined in portions of the outer layer that extend laterally beyond lateral edges of the inner layer. The closure flaps are defined by perforations. The closure flaps are shaped to fold over ends of the object to enclose the object within the cushioning wrap.

19 Claims, 8 Drawing Sheets

(56) References Cited

U.S. PATENT DOCUMENTS

| | | | | | |
|---|---|---|---|---|---|
| 4,059,220 | A | * | 11/1977 | Lorenz | B65D 5/22<br>229/199 |
| 5,489,464 | A | | 2/1996 | Bjorck | |
| 5,639,523 | A | * | 6/1997 | Ellis | B65D 5/425<br>206/521 |
| 5,688,578 | A | | 11/1997 | Goodrich | |
| 5,850,918 | A | * | 12/1998 | Pienta | B65D 85/671<br>206/410 |
| 6,264,031 | B1 | * | 7/2001 | Pienta | B65D 85/671<br>206/410 |
| 6,789,672 | B2 | * | 9/2004 | Takahashi | B65B 25/148<br>206/410 |
| 9,701,091 | B2 | | 7/2017 | Page et al. | |
| 2003/0009988 | A1 | * | 1/2003 | Deis | B65D 81/03<br>53/472 |
| 2008/0093426 | A1 | | 4/2008 | Kircher, Jr. | |
| 2009/0017261 | A1 | | 1/2009 | Hurley, Jr. et al. | |
| 2022/0009690 | A1 | | 1/2022 | Nirmal et al. | |

* cited by examiner

MULTI-LAYER, MULTI-WIDTH CUSHIONING WRAP WITH INTEGRAL CLOSURE FLAPS

BACKGROUND

Packaging is crucial for fragile items to prevent damage during handling and shipping and ensure that the items arrive at their destination safely. During transport, fragile items can be subjected to impacts, vibrations, and temperature changes, all of which increase the risk of breakage. Impacts can result from rough handling, stacking weight on top of other boxes, or simply inadequate protection during transport. Damage can reduce the value of items and result in a disappointed owner/customer. Damage can also result in a beautiful, rare, and/or valuable item becoming unsellable. Therefore, fragile items must be properly packaged to prevent damage during transport. Typically, packaging materials, such as bubble wrap, foam, and packing peanuts, are used to package fragile items because these materials are good at absorbing impacts and distributing force away from packaged items. However, proper packaging using these known packaging materials can require significant amounts of time and work to ensure that a fragile item is sufficiently protected. In addition, it is possible to overpackage fragile items resulting which increases shipping costs.

Hence, what is needed is a way to safely and securely package fragile items, such as glassware, to prevent damage during shipping and handling that is faster than previously known packaging methods and that does not result in increased shipping costs relative to previously known packaging methods.

SUMMARY

In one general aspect, the instant disclosure presents a cushioning wrap for wrapping an object and preventing damage to the object by cushioning impacts. The cushioning wrap includes an inner layer portion having an inner surface for positioning adjacent the object when the object is wrapped with the cushioning wrap. The inner layer portion has a first width that corresponds to a width of the object. The inner layer portion includes at least one layer of cushioning material. The cushioning wrap also includes an outer layer portion having an inner surface secured to an outer surface of the inner layer portion. The outer layer portion has a second width that is greater than the first width. The outer layer portion has at least one layer of cushioning material. Closure flaps are formed in lateral portions of the outer layer portion that extend beyond lateral edges of the inner layer portion. The closure flaps are shaped to fold over ends of the object once the cushioning wrap is wrapped onto the object to enclose the object within the cushioning wrap.

In another general aspect, the instant disclosure provides a method of manufacturing cushioning wrap. The method includes forming an inner layer portion of the cushioning wrap, the inner layer portion having an inner surface for positioning adjacent an object being wrapped, the inner layer portion having a first width, the first width corresponding to a width of an object to be wrapped, the inner layer portion including at least one layer of cushioning material. The method also includes securing an inner surface of an outer layer portion to an outer surface of the inner layer portion, the outer layer portion having a second width that is greater than the first width, the outer layer portion including at least one layer of cushioning material. The method also includes cutting, perforating, and/or marking lateral portions of the outer layer portion that extend laterally beyond the inner layer portion to form closure flaps, the closure flaps being shaped to fold over ends of the object when the cushioning wrap is wrapped around the object to enclose the object within the cushioning wrap.

In yet another general aspect, the instant disclosure provides a cushioning wrap for wrapping an object and preventing damage to the object. The cushioning wrap includes a plurality of layers of cushioning material. The plurality of layers include at least an inner layer and an outer layer. The inner layer has a first width. The outer layer has a second width that is greater than the first width. Closure flaps are defined by perforations in lateral portions of the outer layer that extend laterally beyond lateral edges of the inner layer. The closure flaps are shaped to fold over ends of the object to enclose the object within the cushioning wrap.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject of this disclosure is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

As discussed above, packaging for fragile items is important to reduce the risk of damage during shipping and handling. However, current methods of packaging fragile items are time consuming and can result in increased shipping costs. Typically, packaging materials, such as bubble wrap, foam, and packing peanuts, are used to package fragile items because these materials are good at absorbing impacts and distributing force away from packaged items. However, proper packaging with these materials still takes significant amounts of time. For example, fragile items may be wrapped in one or more layers of a cushioning wrapping material, such as bubble wrap. However, each layer must be wrapped onto an item and then secured, e.g., by taping. Care must be taken to ensure that cushioning is provided on all sides of the item and that the item is retained snugly within the package. In addition, while it's important to keep fragile items secure during transport, it is also possible to overpackage fragile items. Excessive packaging can not only lead to high shipping costs but also affect customer experience and the environment. Finding ways to speed up the packaging process, reduce the amount of work required, and reduce costs while achieving desirable levels of protection for fragile items are therefore a worthwhile endeavors.

The present disclosure is directed to cushioning wrap having multiple layers of cushioning material with different widths that enables fragile items to be packaged with a single wrap that can be enclosed using integral closure features in the form of flaps, thus saving significant amounts of time and labor when wrapping packages. The cushioning wrap has at least one inner layer having a width that corresponds to the width of the item being wrapped. The flaps are formed by at least one wider layer that extends laterally beyond the inner layer to form the flaps. Once the cushioning wrap is wrapped around an item, the flaps can be folded and adhered to each other to tightly enclose the item within the package. The closure flaps may have a triangular shape to facilitate folding when the cushioning wrap is wrapped around an item. The flaps can also be provided with an adhesive which enables the flaps to be adhered together without requiring a separate adhesive.

Figure 1A:
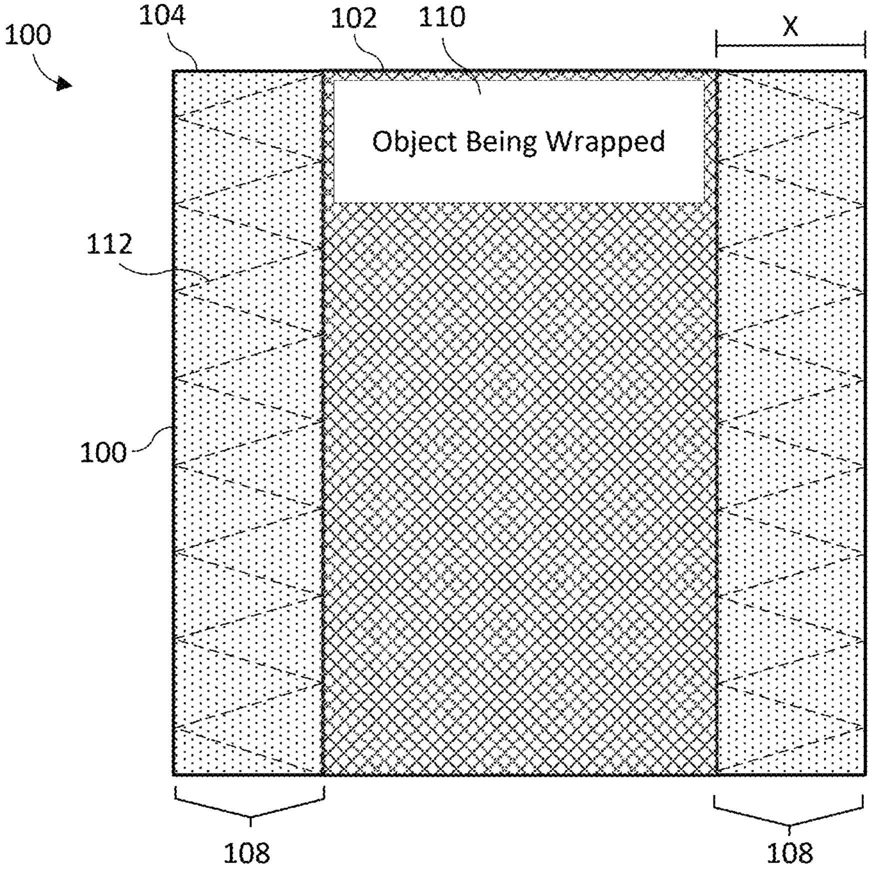
FIG. 1A is a plan view of an example implementation of a multi-layer, multi-width cushioning wrap in accordance with this disclosure showing perforations which define the closure flaps for the wrap.

FIGS. 1A-IE show an example implementation of a multi-layer, multi-width cushioning wrap 100 in accordance with this disclosure. The cushioning wrap 100 comprises a plurality of layers that each comprise a cushioning wrap material. As used herein, "cushioning wrap material" refers to a sheet of material designed to protect items during shipping, moving, or storage by absorbing shock and vibration. Cushioning wrap is designed to prevent damage to fragile or delicate items by minimizing movement and impact. Common types of cushioning wrap include bubble wrap, foam wrap, and honeycomb paper wrap. Bubble wrap is made of a flexible, plastic material which forms a sheet of air-filled bubbles which provide cushioning for wrapped objects. Foam wrap is made of a foam material, such as polyurethane or polyethylene foam, in which many small bubbles of air or gas are formed which provide cushioning for wrapped objects. Honeycomb paper wrap is a type of paper wrap that has been die-cut to form a honeycomb pattern which expands to provide a cushioning effect when used to wrap objects.

Figure 1B:
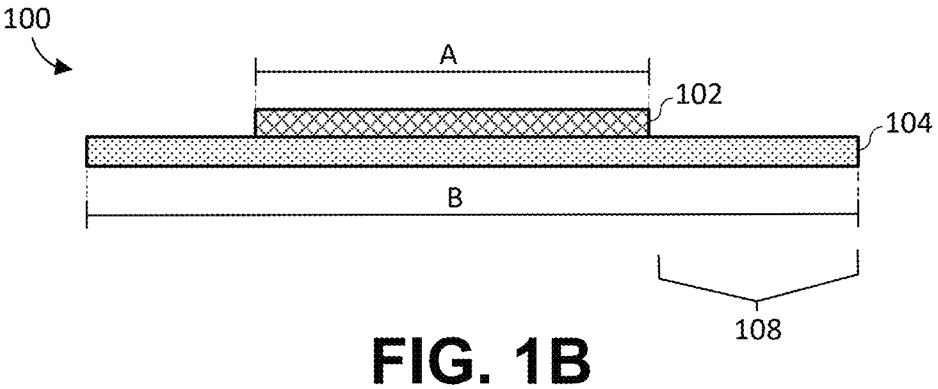
FIG. 1B is a cross-sectional view of the cushioning wrap of FIG. 1A showing the layer configuration.

The cushioning wrap 100 of FIGS. 1A and 1B includes an inner layer portion 102 and an outer layer portion 104 that each have different widths. In this example, the inner layer portion 102 has a width A and the outer layer portion 104 has a width B that is greater than width A. In various implementations, the width A of the inner layer portion 102 is selected to correspond to the width of the object being wrapped 110. In various implementations, different sized cushioning wraps may be provided for wrapping different sized objects. For example, a first cushioning wrap may be provided with an inner layer portion having a width of approximately 6" for wrapping objects having a width up to 6"; a second cushioning wrap may be provided with an inner layer portion having a width of 8" for wrapping objects having a width between 6" and 8"; a third cushioning wrap may be provided with an inner layer portion having a width of 12" for wrapping objects having a width between 8" and 12"; and a fourth cushioning wrap may be provided with an inner layer portion having a width of 16" for wrapping objects having a width between 12" and 16".

Figure 1C:
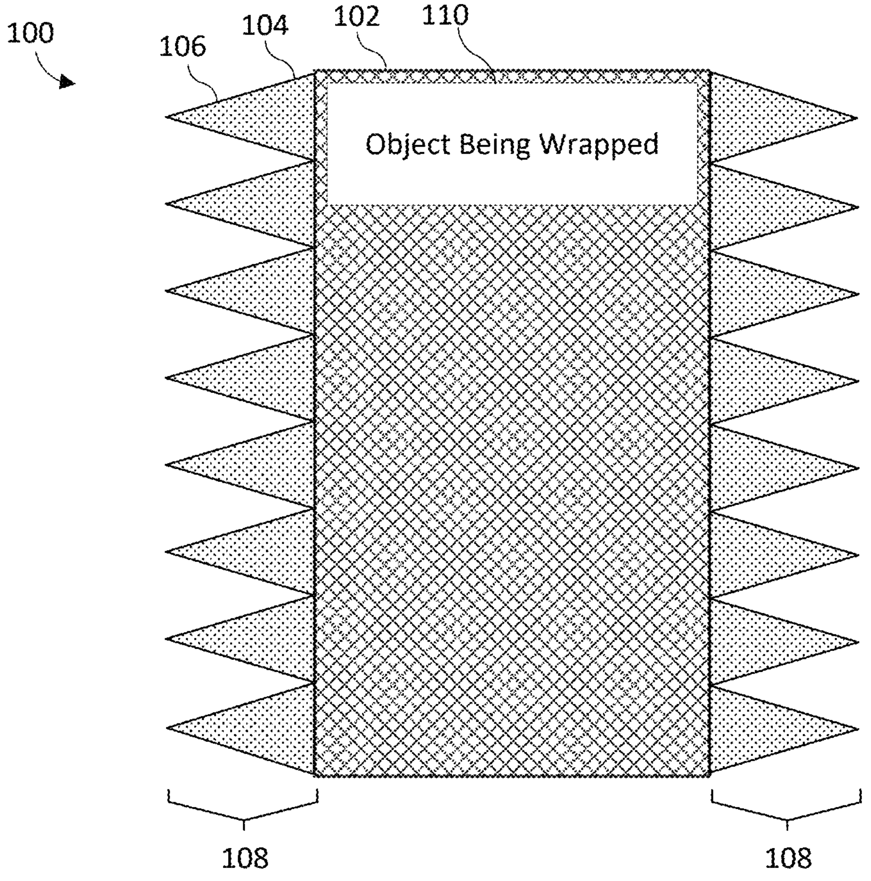
FIG. 1C is a plan view of the cushioning wrap of FIG. 1A with the end flaps released.
Figure 1D:
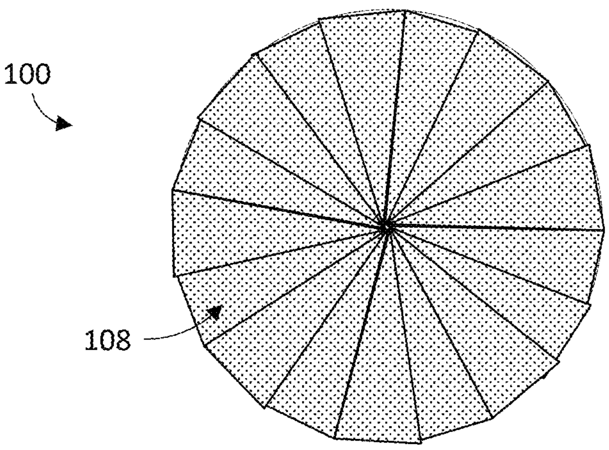
FIG. 1D is an end view of the cushioning wrap of FIG. 1A shown wrapped around an object.

The lateral portions of the outer layer 104 which extend laterally beyond the lateral edges of the inner layer 102 form closure flaps 108. As shown in FIG. 1C, the closure flaps 108 are designed to be folded over the lateral ends of the object 110 to enclose the object in the package and to provide cushioning and protection for the ends of the object. To this end, the closure flaps may have any suitable length from the outer edges of the inner layer portion 102 to the outer edges of the outer layer portion 104. In various implementations, the closure flaps 108 have a length X of approximately 1"-4". The thickness of the closure flaps 108 is less than the thickness of the inner layer portion 102 which enables the flaps to be folded relatively easily and consistently along the edges of the inner layer portion 102. Once folded over, the flaps 108 can be secured together to seal the package closed, as can be seen in FIG. 1D. The closure flaps 108 can be secured to each other and to the ends of the object being wrapped using an adhesive material, such as an adhesive tape. In some implementations, the inward facing portions of the flaps 108 can be provided with an adhesive material during the manufacturing process for the wrap.

Figure 1E:
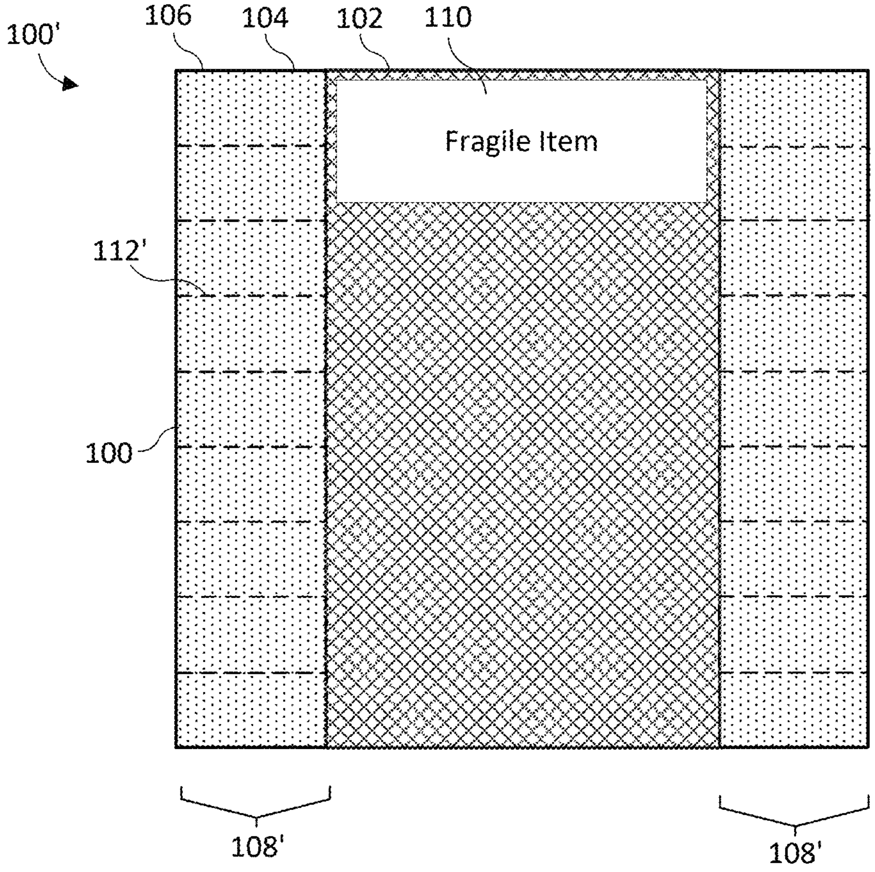
FIG. 1E is a plan view of an example implementation of a cushioning wrap having an alternative configuration for the closure flaps.

The closure flaps 108 are provided with a predetermined size and shape to facilitate folding of the closure flaps after the cushioning wrap 100 has been wrapped around an object. In various implementations, the closure flaps 108 are defined in the lateral portions of the outer layer 104 by perforations, as can be seen in FIG. 1A. Perforations facilitates the removal of excess material to form the flaps by the end user. FIG. 1D shows the cushioning wrap after the excess material has been removed, leaving the closure flaps 108. In some implementations, the cushioning wrap can be cut during the manufacturing process to form the final shape of the closure flaps. In the implementation of FIGS. 1A-1E, the closure flaps 108 have a triangular shape. However, any suitable shape may be used for the closure flaps. FIG. 1E shows an example implementation of a cushion wrap 100' which has closure flaps 108' which are rectangularly shaped.

Figure 2A:
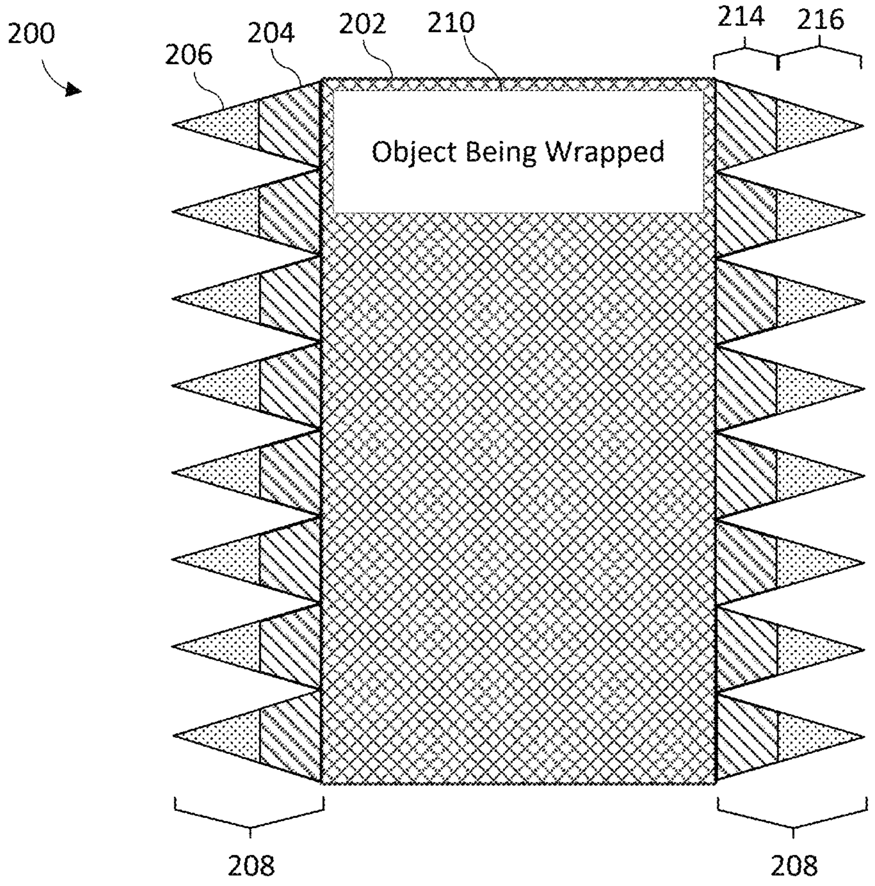
FIG. 2A is a plan view of another example implementation of a multi-layer, multi-width cushioning wrap in accordance with this disclosure.
Figure 2B:
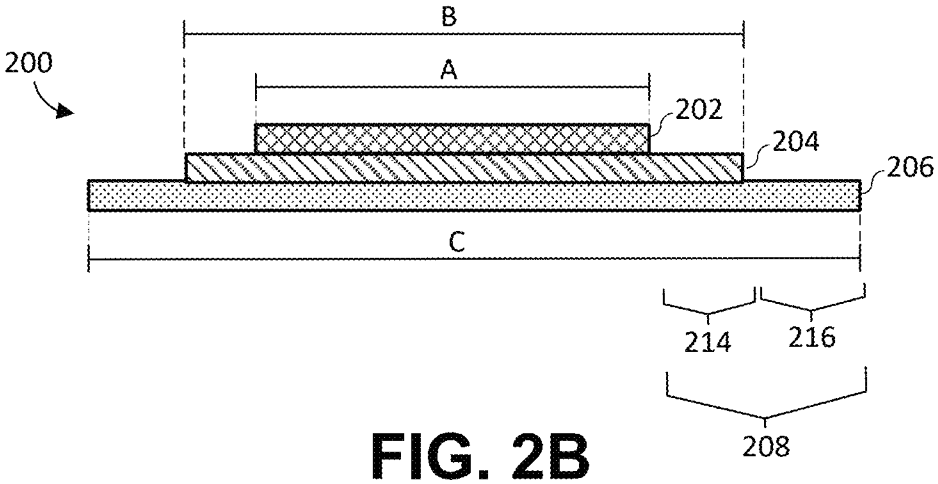
FIG. 2B is a cross-sectional view of the cushioning wrap of FIG. 2A.
Figure 2C:
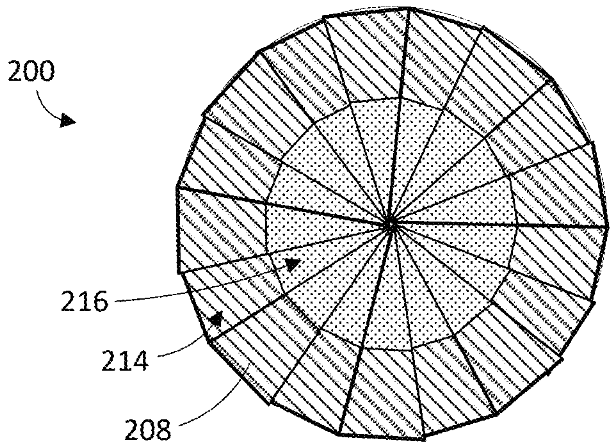
FIG. 2C is an end view of the cushioning wrap of FIG. 2A shown wrapped around an object.

The cushioning wrap shown in FIGS. 1A-IE has two layers. An example implementation of a cushioning wrap 200 having more than two layers is shown in FIGS. 2A-2C. The cushioning wrap 200 includes an inner layer 202, an intermediate layer 204, and an outer layer 206 that each have different widths. For example, the inner layer 202 has a width A, the intermediate layer 204 has a width B that is greater than the width A, and the outer layer 206 has a width C that is greater than the width B. In various implementations, the width A of the inner layer 202 is selected to correspond to the width of the object being wrapped 210. The lateral portions of the intermediate layer and outer layer, respectively, extend laterally beyond the lateral edges of the inner form closure flaps. In this example, each flap has a first section 214 formed by the lateral portions of the intermediate layer 204 and the outer layer 206. Each flap also has a second section which is formed by a lateral portion of the outer layer 206 which extends laterally beyond an outer edge of the intermediate layer 204.

As shown in FIG. 2C, the closure flaps 208 are designed to be folded over to enclose the object in the package and to provide cushioning and protection for the ends of the object, as shown in FIG. 2C. The thickness of the closure flaps 208 is less than the thickness of the inner layer portion 102 which enables the flaps 208 to be folded relatively easily and consistently along the edges of the inner layer portion 202. In addition, the second section 216 of each closure flap 208 is thinner than the first section 214. Forming portions of the closure flaps with different thicknesses facilitates different folding configurations for the flaps which may be beneficial in wrapping particular items. Once folded over, the flaps 208 can be secured together to seal the package closed. The closure flaps 208 can be secured to each other and to the ends of the object being wrapped using an adhesive material.

Figure 3:
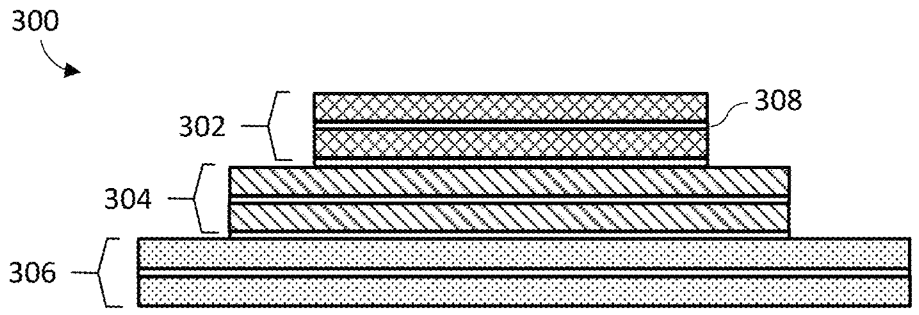
FIGS. 3-5 show cushioning wraps with different example layer configurations.

Each layer of a cushioning wrap may be formed by multiple sub-layers having the same width. Each sub-layer can formed of the same or different types of cushioning material. FIG. 3 shows an example implementation of a cushioning wrap 300 having an inner layer 302, an intermediate layer 304, and an outer layer portion 306 that each have multiple sub-layers. In this example, each layer 302, 304, 306 has two sub-layers of cushioning wrap. Each layer and sub-layer may be adhered to an adjacent layer or sub-layer using an adhesive layer 308. Any suitable adhesive may be used. In various implementations, the adhesive material may be provided as a sheet that is arranged between layers. The adhesive material may be activated via heat and/or compression applied to the cushioning layers during manufacturing.

Figure 4:
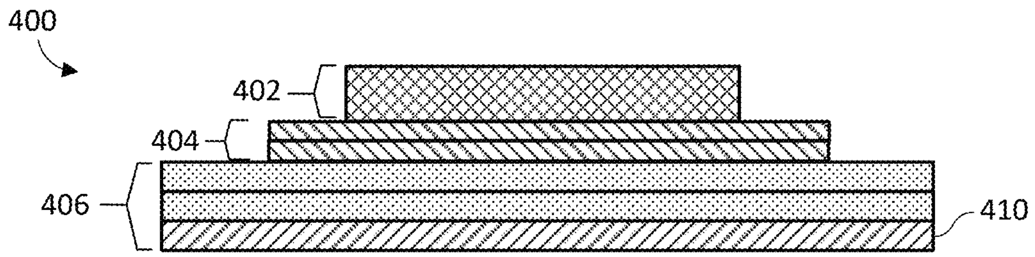
Figure 5:
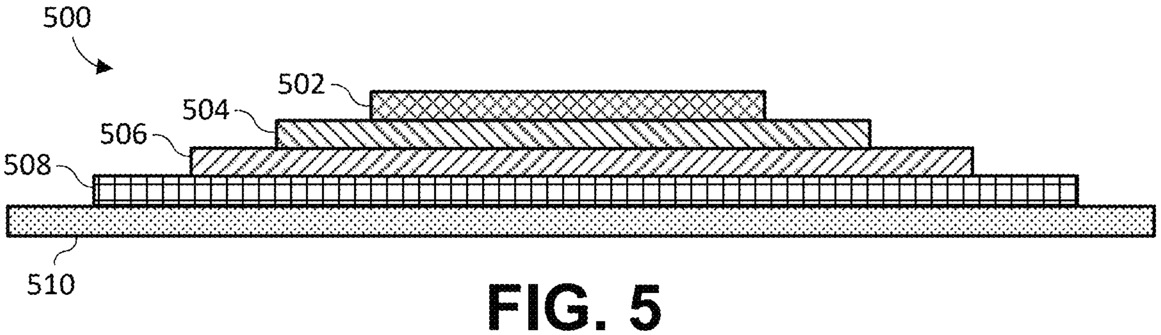

Each layer of cushioning can be provided with any suitable number and type of sub-layers. For example, FIG. 4 shows an example implementation of a cushioning wrap 300 that includes an inner layer portion 302, an intermediate layer portion 304, and an outer layer portion 306. In this example, the inner layer portion 302 has a single layer of cushioning wrap material, the intermediate layer portion 304 has two layers of cushioning wrap material, and the outer layer portion 306 has two layers of cushioning wrap material and an outer support layer 410. The outer support layer 410 is formed of a support material, such as thick paper, thick plastic, foil, and the like, which can facilitate handling of the cushioning wrap and processing of the wrap, e.g., cutting, during use. The previous examples of cushioning wrap have layers with two or three different widths. In various implementations, the cushioning wrap may be provided with layers having more than three widths. FIG. 5 shows an example implementation of a cushioning wrap 500 having five layers 502, 504, 506, 508, and 510 that each have a different width.

Figure 6:
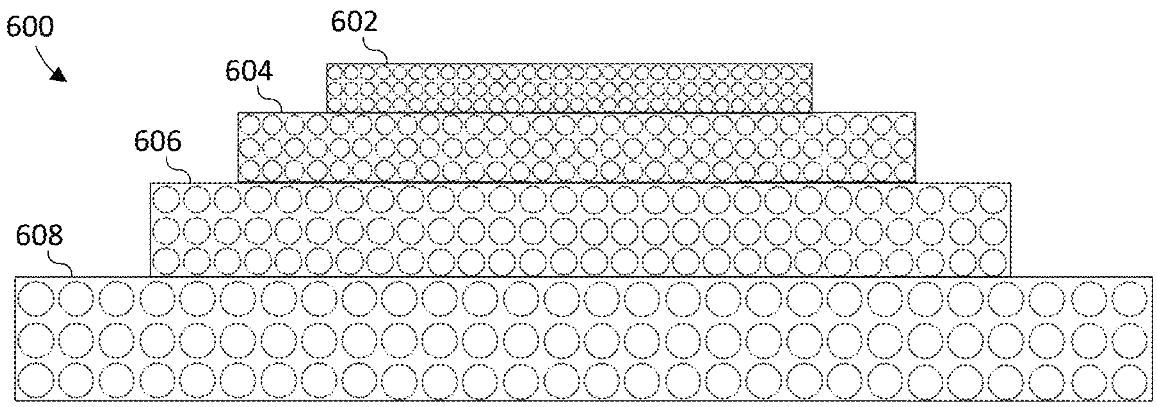
FIG. 6 shows an example layer configuration for the layers of a cushioning wrap where the layers are formed of bubble wrap having different bubble sizes.

Each cushioning layer in a cushioning wrap can be formed of the same or different types of cushioning material. For example, bubble wrap, foam wrap, and honeycomb paper wrap can each be used to form different layers in the same wrap. In some implementations, different configurations of the same cushioning material may be used to form different layers in the same wrap. For example, bubble wrap may be provided with different size air bubbles. FIG. 6 shows an example implementation of a cushioning wrap 600 that includes four layers 602, 604, 606, 608 of bubble wrap with each layer having a different width and a different air bubble size. In this example, the innermost layer 602 has the smallest air bubble size with the air bubble size increasing in each subsequent layer. Using this configuration, the innermost layer having the smaller air bubble size can conform more closely to the shape of the object being wrapped. This increases the surface area of the object that is positioned in contact with the cushioning material which helps to prevent the formation of open spaces and gaps around the object during the wrapping process. Each subsequent layer conforms to the wrapped shape formed by the object being wrapped and any inner cushioning layers surrounding the object. As this shape gets larger for each wrapped layer, bubble wrap with larger bubble sizes can be used which increases the amount of cushioning provided. Although four layers are shown in the example of FIG. 6, cushioning wrap have bubble wrap layers with different bubble sizes can be provided with two, three, and more than four layers.

Figure 7B:
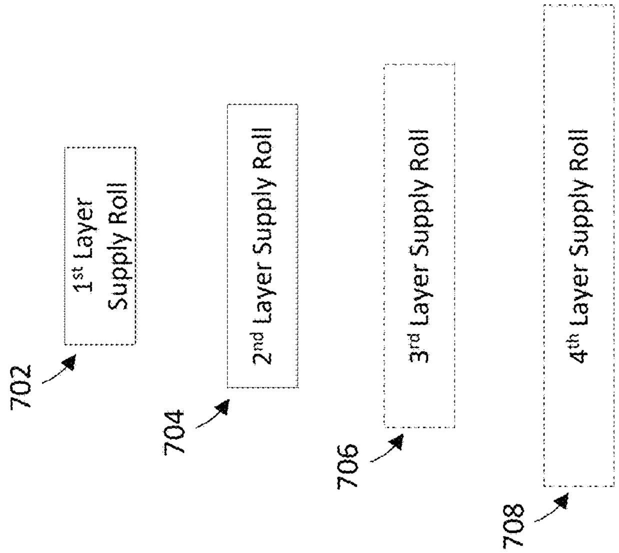
FIGS. 7A and 7B are diagrams showing an example implementation of a manufacturing system for manufacturing cushioning wrap, such as the cushioning wrap of FIG. 1.
Figure 7A:
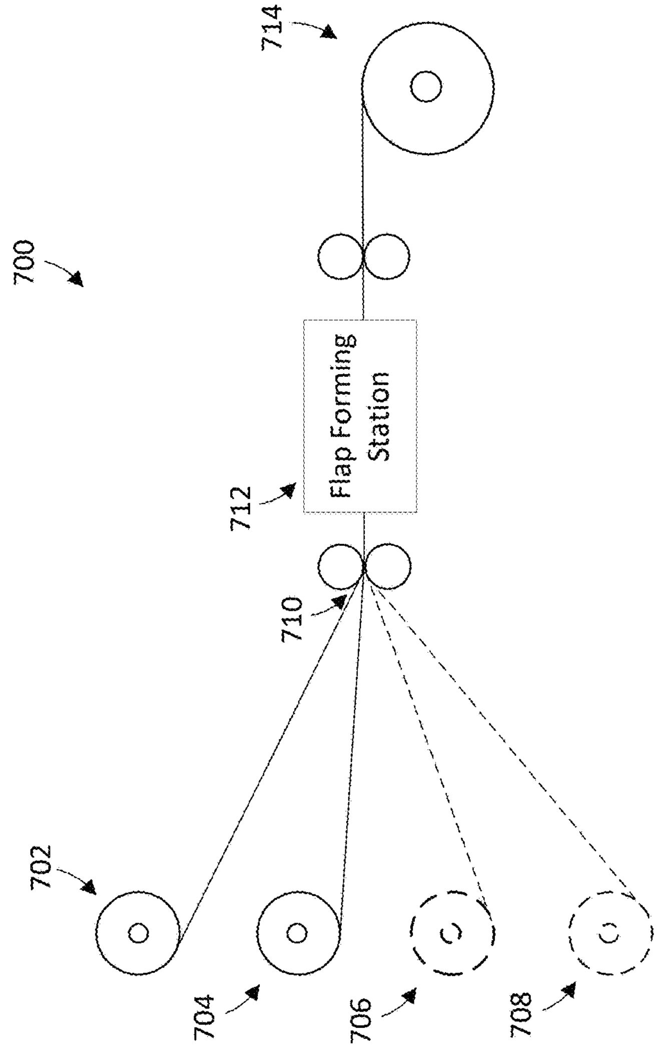

The multi-layer, multi-width cushioning wrap may be manufactured in any suitable manner. One example of a manufacturing system that may be used to manufacture the cushioning wrap is shown in FIGS. 7A and 7B. In this example, two layers of cushioning material are used to form the multi-layer, multi-width wrap although any suitable number of layers may be used. Each layer of cushioning material is supplied from a respective supply roll. In this example, a first supply roll 702 supplies a first layer of cushioning material and a second supply roll 704 supplies a second layer of cushioning material to form the wrap. Additional layers of material may be used as shown in dotted lines in FIGS. 7A and 7B. For example, in addition to the first and second layers, a third supply roll 706 may supply a third layer of cushioning material, and a fourth supply roll 708 may supply a fourth layer of cushioning material. As can be seen in FIG. 7B, the first supply roll 702 supplies the innermost cushioning layer for the wrap and therefore has the narrowest width. The second supply roll 704 supplies a cushioning layer having a width greater than the width of the first supply roll 702. If used, the third supply roll 706 supplies a cushioning layer having a width greater than the width of the second supply roll 702, and the fourth supply roll 708 supplies a cushioning layer having a width greater than the width of the third supply roll 702.

In this example, the layers of cushioning material form a stack which is fed to a fixing station 710. The fixing station 710 applies pressure and/or heat to the stack to adhere the layers together. The system 700 includes a flap forming station 712 which performs a cutting, perforating, and/or marking process to define the closure flaps. The flap forming station 712 may also be configured to apply an adhesive material to an inner surface of the closure flaps. In this example, the cushioning wrap is wound onto a take up roll 714. Alternatively, the cushioning wrap can be supplied to a cutting station for cutting the wrap into segments having one or more predetermined lengths.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms “comprises,” “comprising,” or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by “a” or “an” does not, without further constraints, preclude the existence of additional identical elements in the process, method, article, or apparatus that comprises the element. Furthermore, subsequent limitations referring back to “said element” or “the element” performing certain functions signifies that “said element” or “the element” alone or in combination with additional identical elements in the process, method, article or apparatus are capable of performing all of the recited functions.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A cushioning wrap for wrapping an object and preventing damage to the object by cushioning impacts, the cushioning wrap comprising:

an inner layer portion having an inner surface for positioning adjacent the object when the object is wrapped with the cushioning wrap, the inner layer portion having a first width, the first width corresponding to a width of the object, the inner layer portion including at least one layer of cushioning material;

an outer layer portion having an inner surface secured to an outer surface of the inner layer portion, the outer layer portion having a second width that is greater than the first width, the outer layer portion including at least one layer of cushioning material;

an intermediate layer portion arranged between the inner layer portion and the outer layer portion, the intermediate layer portion having an inner surface that is secured to the outer surface of the inner layer portion, and an outer surface that is secured to the inner surface of the outer layer portion, the intermediate layer portion having a third width that is greater than the first width and less than the second width; and closure flaps formed in lateral portions of the outer layer portion that extend beyond lateral edges of the inner layer portion, the closure flaps being shaped to fold over ends of the object once the cushioning wrap is wrapped onto the object to enclose the object within the cushioning wrap.

2. The cushioning wrap of claim 1, wherein the cushioning material used for the at least one layer of the inner layer portion and the at least one layer of the outer layer portion, respectively, is one of bubble wrap, foam wrap, and er honeycomb paper wrap.

3. The cushioning wrap of claim 1, wherein the closure flaps are defined by perforations in the lateral portions of the outer layer portion.

4. The cushioning wrap of claim 3, wherein the closure flaps are triangular shaped.

5. The cushioning wrap of claim 4, further comprising:

an outer support layer secured to an outer surface of the outer layer portion.

6. The cushioning wrap of claim 1, wherein:

each closure flap has a first section formed by a part of the outer layer portion and a part of the intermediate layer portion that extend laterally beyond the inner layer portion, and each closure flap has a second section formed by a part of the outer layer portion that extends laterally beyond the intermediate layer portion.

7. The cushioning wrap of claim 1, wherein:

the inner layer portion is formed of bubble wrap having a first bubble size, and the outer layer portion is formed of bubble wrap having a second bubble size that is greater than the first bubble size.

8. The cushioning wrap of claim 1, wherein the first width is one of 6 inches, 8 inches, 10 inches, 12 inches, and 16 inches.

9. The cushioning wrap of claim 1, wherein:

the second width is a first predetermined distance wider than the first width, and the first predetermined distance is in a range from 1 inches to 4 inches.

10. A method of manufacturing cushioning wrap, the method comprising:

forming an inner layer portion of the cushioning wrap, the inner layer portion having an inner surface for positioning adjacent an object being wrapped, the inner layer portion having a first width, the first width corresponding to a width of an object to be wrapped, the inner layer portion including at least one layer of cushioning material;

securing an inner surface of an outer layer portion to an outer surface of the inner layer portion, the outer layer portion having a second width that is greater than the first width, the outer layer portion including at least one layer of cushioning material;

providing an intermediate layer portion arranged between the inner layer portion and the outer layer portion, the intermediate layer portion having an inner surface that is secured to the outer surface of the inner layer portion, and an outer surface that is secured to the inner surface of the outer layer portion, the intermediate layer portion having a third width that is greater than the first width and less than the second width; and at least one of cutting, perforating, and/or marking lateral portions of the outer layer portion that extend laterally beyond the inner layer portion to form closure flaps, the closure flaps being shaped to fold over ends of the object when the cushioning wrap is wrapped around the object to enclose the object within the cushioning wrap.

11. The method of claim 10, wherein securing the inner surface of the outer layer portion to the outer surface of the inner layer portion further comprises:

feeding a first sheet of cushioning material for the inner layer portion having the first width and a second sheet of cushioning material for the outer layer portion having the second width to a fixing station, the first sheet and the second sheet being stacked on top of each other to form a stack of sheets, the fixing station being configured to apply at least one of pressure and heat to the stack of sheets to adhere the first sheet and the second sheet together.

12. The method of claim 11, wherein at least one of cutting, perforating, and marking the lateral portions further comprises:

feeding the stack of sheets to a flap forming station which at least one of cuts, perforates, and marks the lateral portions of the outer layer portion to form the closure flaps.

13. The method of claim 10, wherein the cushioning material used for the at least one layer of the inner layer portion and the at least one layer of the outer layer portion, respectively, is one of bubble wrap, foam wrap, and honeycomb paper wrap.

14. The method of claim 10, wherein the closure flaps are triangular shaped.

15. The method of claim 10, further comprising:

applying an adhesive material to an inner surface of the closure flaps.

16. The method of claim 10, wherein:

the inner layer portion is formed of bubble wrap having a first bubble size, and the outer layer portion is formed of bubble wrap having a second bubble size that is greater than the second bubble size.

17. A cushioning wrap for wrapping an object and preventing damage to the object by cushioning impacts, the cushioning wrap comprising:

a plurality of layers of cushioning material, the plurality of layers including at least an inner layer, an outer layer, and an intermediate layer, the inner layer having a first width, the outer layer having a second width that is greater than the first width, the intermediate layer arranged between the inner layer and the outer layer, the intermediate layer having an inner surface that is secured to an outer surface of the inner layer, and an outer surface that is secured to an inner surface of the outer layer, the intermediate layer having a third width that is greater than the first width and less than the second width; and closure flaps defined in portions of the outer layer that extend laterally beyond lateral edges of the inner layer, the closure flaps being defined by perforations, the closure flaps being shaped to fold over ends of the object to enclose the object within the cushioning wrap.

18. The cushioning wrap of claim 17, wherein the cushioning material used for each layer of the plurality of layers, respectively, is one of bubble wrap, foam wrap, and honeycomb paper wrap, respectively.

19. The cushioning wrap of claim 18, wherein:

the inner layer is formed of bubble wrap having a first bubble size, and the outer layer is formed of bubble wrap having a second bubble size that is greater than the first bubble size.

* * * * *